Patented Apr. 21, 1925.

1,534,535

UNITED STATES PATENT OFFICE.

BERTRAM MAYER, OF BASEL, AND JAKOB WÜRGLER, OF NEUEWELT, NEAR BASEL, SWITZERLAND, ASSIGNORS TO SOCIETY OF CHEMICAL INDUSTRY IN BASLE, OF BASEL, SWITZERLAND.

ANTHRACENE DERIVATIVE AND PROCESS FOR MAKING THE SAME.

No Drawing. Application filed January 4, 1924. Serial No. 684,451.

*To all whom it may concern:*

Be it known that we, BERTRAM MAYER and JAKOB WÜRGLER, both citizens of the Swiss Republic, and residing, the former at Basel, Switzerland, and the latter at Neuewelt, near Basel, Switzerland, have invented a new and useful New Anthracene Derivative and Process of Making the Same, of which the following is a full, clear, and exact specification.

This invention relates to a new anthracene derivative and to a novel and useful process of making the same.

It has been found that a new anthracene derivative, the anthracene-2-thioglycolic-3-carboxylic acid, is obtained by treating the anthraquinone-2-thioglycolic-3-carboxylic acid with reducing agents.

The anthracene-2-thioglycolic-3-carboxylic acid, thus obtained, which is of great industrial importance as a starting material for the manufacture of valuable new dyestuffs and intermediate products, forms a citron-yellow powder. It is sparingly soluble in nitrobenzene, alcohol and boiling water, but soluble in boiling glacial acetic acid to a yellowish solution, in sulphuric acid to a orange solution and in chlorosulphonic acid to a solution which is at first deep red and then brown. In cold alkalies it dissolves sparingly, but freely in hot alkalies to an olive solution.

It corresponds with great probability to the following formula:

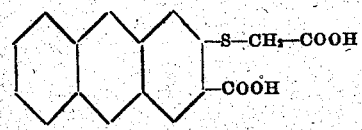

In order to illustrate the new process more fully the following example is given, the parts being by weight.

*Example.*

50 parts of anthraquinone-2-thioglycolic-3-carboxylic acid are introduced into 1000 parts of ammonia of 12 per cent strength, 125 parts of zinc dust are added and the mixture is boiled in a reflux apparatus, while stirring well, until the solution which is at first deep cherry-red and then brown is completely decolorized. The solution is then filtered from the zinc, the ammonia distilled and the liquid again filtered and treated hot with a mineral acid to produce a precipitate which is a citron-yellow powder consisting of anthracene-2-thioglycolic-3-carboxylic acid.

What we claim is:

As a new product of manufacture the herein described anthracene-2-thioglycolic-3-carboxylic acid having most probably the formula:

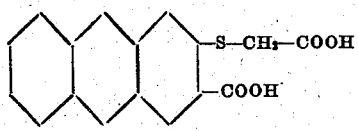

which forms a citron-yellow powder, sparingly soluble in nitrobenzene, alcohol, and boiling water, but soluble in boiling glacial acetic acid to a yellowish solution, in sulphuric acid to an orange solution, in chlorosulphonic acid to a solution which is at first deep red and then brown, and in hot alkalies to an olive solution.

In witness whereof we have hereunto signed our names this 20th day of December, 1923, in the presence of two subscribing witnesses.

BERTRAM MAYER.
JAKOB WÜRGLER.

Witnesses:
AMAND BAUN,
M. SPENGLER.